Patented June 24, 1930

1,766,720

UNITED STATES PATENT OFFICE

FRITZ NICOLAI, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF PHOSPHORIC ESTERS OF ALIPHATIC ALCOHOLS

No Drawing. Application filed September 4, 1928, Serial No. 303,955, and in Germany October 12, 1927.

The present invention relates to the production of phosphoric esters of aliphatic alcohols.

The neutral phosphoric esters of aliphatic alcohols have hitherto been prepared either from silver phosphate and alykyl iodides, or by the action of phosphorus oxychlorid on sodium alcoholates. Although it has already been proposed to produce triethyl phosphate by the action of phosphorus oxychlorid on anhydrous ethyl alcohol, it was considered necessary in this case to cool strongly with ice, in order to prevent the evolution of the hydrochloric acid during the reaction, the hydrochloric acid being thereupon displaced from the resulting mixture by a continuous current of dry carbon dioxid, and the mixture being gently warmed on the water bath. This method of working however is not applicable for industrial purposes since the yield of triethyl phosphate is insufficient, whilst the conditions change even more for the worse if other alcohols be employed.

I have now found that neutral phosphoric esters of primary aliphatic alcohols are obtained, with good, and in many cases nearly quantitative, yields by allowing phosphorus oxychlorid to act on the alcohols in such a way that the hydrochloric acid formed during the reaction is removed as such from the reaction liquid while the reaction is still proceeding. This can be effected by working at elevated temperatures, preferably at about the boiling point of the mixture, or by carrying on the reaction under reduced pressure, the combination of both conditions being particularly advantageous.

For example, the process may be carried out by placing the alcohol in a vessel connected with a reflux condenser and under reduced pressure, and warming it to the desired temperature, the phosphorus oxychlorid being then gradually admitted, in liquid or vapor form, whilst the bulk of the hydrochloric acid formed is continuously removed. The mixture is then kept boiling for a short time, under reduced pressure, until the vapors of hydrochloric acid have almost entirely passed over, the resulting trialkyl phosphate being afterwards recovered by distillation under reduced pressure. It is advantageous to employ an amount of alcohol in excess to that required for esterification, but other suitable diluents may also be added, preferably such as lower the boiling point of the mixture, such as chloroform or benzene. Moreover, metallic catalysts, such as copper powder, metal chlorids, and the like may be added to the reaction liquid, in order to facilitate the splitting off of the hydrochloric acid. The degree of reduced pressure employed may vary within wide limits, but should be as low as attainable. If desired, the components may also be mixed in the cold, and the reaction then carried to completion by heating, reduced pressure being employed, for example by passing the reaction mixture through a heated vessel or tube.

The following examples will further illustrate the nature of the said invention which however is not restricted thereto. The parts are by weight.

Example 1

The vapors of 154 parts of phosphorus oxychlorid, under an absolute pressure of 25 to 40 millimetres of mercury, are passed in the course of 30 minutes into 400 parts of n-butyl alcohol at about 50° C., contained in a vessel provided with a reflux condenser. The mixture is then kept boiling for from about 30 to 60 minutes longer, and, subsequently, the remainders of butyl alcohol are distilled off, followed by the resulting tributyl phosphate, by distillation under a good vacuum. Pure tri-n-butyl phosphate boils at 135° C. under a pressure of 5 millimetres of mercury. The yield is about 85 per cent of the theoretical.

If, under the same conditions, the n-butyl alcohol be replaced by isobutyl alcohol or primary amyl alcohol, the latter for example in the form of fermentation amyl alcohol, a similarly good yield is obtained of tri-isobutyl phosphate, boiling at 112° C. under 4 to 5 millimetres of mercury, or tri-amyl phosphate, boiling at 143 to 144° C. under a pressure of 2.5 millimetres of mercury. The procedure is similar for the production of triethyl phosphate.

*Example 2*

By working with the same amounts of phosphorus oxychlorid and isobutyl alcohol as specified in Example 1, but under atmospheric pressure and at a temperature of from 100 to 110° C., tri-isobutyl phosphate is also obtained, but in a smaller yield than when operating under reduced pressure, namely about 70 per cent of that obtained according to Example 1.

What I claim is:—

1. The process of producing neutral phosphoric esters of primary aliphatic alcohols which comprises acting with phosphorus oxychlorid upon a primary aliphatic alcohol while heating and continuously removing the hydrochloric acid formed during the process.

2. The process of producing neutral phosphoric esters of primary aliphatic alcohols which comprises acting with phosphorus oxychlorid upon a primary aliphatic alcohol while heating the mixture to about its boiling point and continuously removing the hydrochloric acid formed during the process.

3. The process of producing neutral phosphoric esters of primary aliphatic alcohols which comprises acting with phosphorus oxychlorid upon a primary aliphatic alcohol while reducing the pressure within the reaction vessel and heating the mixture to about its boiling point.

4. The process of producing neutral phosphoric esters of primary aliphatic alcohols which comprises acting with phosphorus oxychlorid upon a primary alcohol in an amount in excess to that required for esterification, while heating and continuously removing the hydrochloric acid formed during the process.

5. The process of producing neutral phosphoric esters of primary aliphatic alcohols which comprises acting with phosphorus oxychlorid upon a primary alcohol in the presence of a metallic catalyst while heating and continuously removing the hydrochloric acid formed during the process.

6. The process of producing neutral phosphoric esters of primary aliphatic alcohols which comprises acting with phosphorus oxychlorid upon a primary butyl alcohol at about the boiling point of the mixture while continuously removing the hydrochloric acid formed during the process.

7. The process of producing neutral phosphoric esters of primary aliphatic alcohols which comprises acting with phosphorus oxychlorid upon butyl alcohol at about 50° C. and reducing the pressure within the reaction vessel to below 60 millimetres (mercury gauge).

In testimony whereof I have hereunto set my hand.

FRITZ NICOLAI.